US012602901B2

(12) United States Patent
Ding et al.

(10) Patent No.: US 12,602,901 B2
(45) Date of Patent: Apr. 14, 2026

(54) MULTIMODAL ARTIFICIAL INTELLIGENCE-BASED COMMUNICATION SYSTEMS

(71) Applicant: International Business Machines Corporation, Armonk, NY (US)

(72) Inventors: Yuan Yuan Ding, Shanghai (CN); Yang Liu, Zhong Xin City (CN); Jing Zhang, Shanghai (CN); Yu Pan, Shanghai (CN); Shi Yun Liang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 18/504,758

(22) Filed: Nov. 8, 2023

(65) Prior Publication Data

US 2025/0148750 A1 May 8, 2025

(51) Int. Cl.
*G06V 10/44* (2022.01)

(52) U.S. Cl.
CPC .................................. *G06V 10/454* (2022.01)

(58) Field of Classification Search
CPC .................................................. G06V 10/454
See application file for complete search history.

(56) References Cited

U.S. PATENT DOCUMENTS 9,305,569 B2 4/2016 Jang et al.
11,222,632 B2 1/2022 Liu et al.

2012/0027305 A1 2/2012 Kim et al.
2014/0379353 A1 12/2014 Boies et al.
2022/0004809 A1* 1/2022 Iyer ...................... G06N 3/0475
(Continued)

FOREIGN PATENT DOCUMENTS

CN 107340865 B 11/2017
CN 111581470 A 8/2020
(Continued)

OTHER PUBLICATIONS

Jain, Aman, et al. "Select, substitute, search: A new benchmark for knowledge-augmented visual question answering." Proceedings of the 44th International ACM SIGIR Conference on Research and Development in Information Retrieval. 2021. (Year: 2021).*

(Continued)

*Primary Examiner* — David Perlman
(74) *Attorney, Agent, or Firm* — Ryan, Mason & Lewis, LLP

(57) ABSTRACT

Methods, apparatus, and computer program products for multimodal artificial intelligence-based communication systems are provided herein. A computer-implemented method includes generating, using a first set of one or more artificial intelligence techniques, identifying information for one or more objects detected in image data associated with at least one user query; generating at least one updated version of the at least one user query by processing, using a second set of one or more artificial intelligence techniques, at least a portion of the at least one user query in conjunction with at least a portion of the identifying information for the one or more objects; generating at least one response to the at least one updated version of the at least one user query; and performing one or more automated actions based at least in part on the at least one response.

20 Claims, 7 Drawing Sheets

(56) References Cited

U.S. PATENT DOCUMENTS

2023/0154214 A1* 5/2023 Frey ....................... G06V 20/64
                                                      382/103
2024/0362279 A1* 10/2024 Kharbanda ......... G06F 16/9032
2025/0078329 A1* 3/2025 Xue ......................... G06F 16/58
2025/0130926 A1* 4/2025 Winkler .............. G06F 11/3684

FOREIGN PATENT DOCUMENTS

CN       114270337 A    4/2022
WO      2021003471 A1   1/2021
WO      2021030449 A1   2/2021

OTHER PUBLICATIONS

Abalos et al., A Multimodal Dialogue System for an Ambient Intelligent Application in Home Environments, International Conference on Text, Speech and Dialogue, 2010.

Wikipedia, Xiaoice, https://en.wikipedia.org/w/index.php?title=Xiaoice&oldid=1173285613, Sep. 1, 2023.

Yahoo Finance, Baidu's AI-powered smartphone from smart speaker unit Xiaodu includes a 'tutor' to help children study English, May 17, 2023.

Wikipedia, Siri, https://en.wikipedia.org/w/index.php?title=Siri&oldid=1183985109, Nov. 7, 2023.

Wikipedia, IBM Waston, https://en.wikipedia.org/w/index.php?title=IBM_Watson&oldid=1183932693, Nov. 7, 2023.

* cited by examiner

OBJECT DETECTION AND
EXTRACTION SUB-SYSTEM

539

It's too hot and how can I make myself calm down quickly

514

TEXT GENERATION MODEL

550

MESSAGE ENCODER

554

JOINT ATTENTION

MESSAGE ATTENTION

556

560

DECODER

KEYWORD ENCODER

TOPIC ATTENTION

558

552

538 sun, tree, dog, road, human, store

562

I am running on the road and there is a store nearby. It's too hot and how can I make myself calm down quickly?

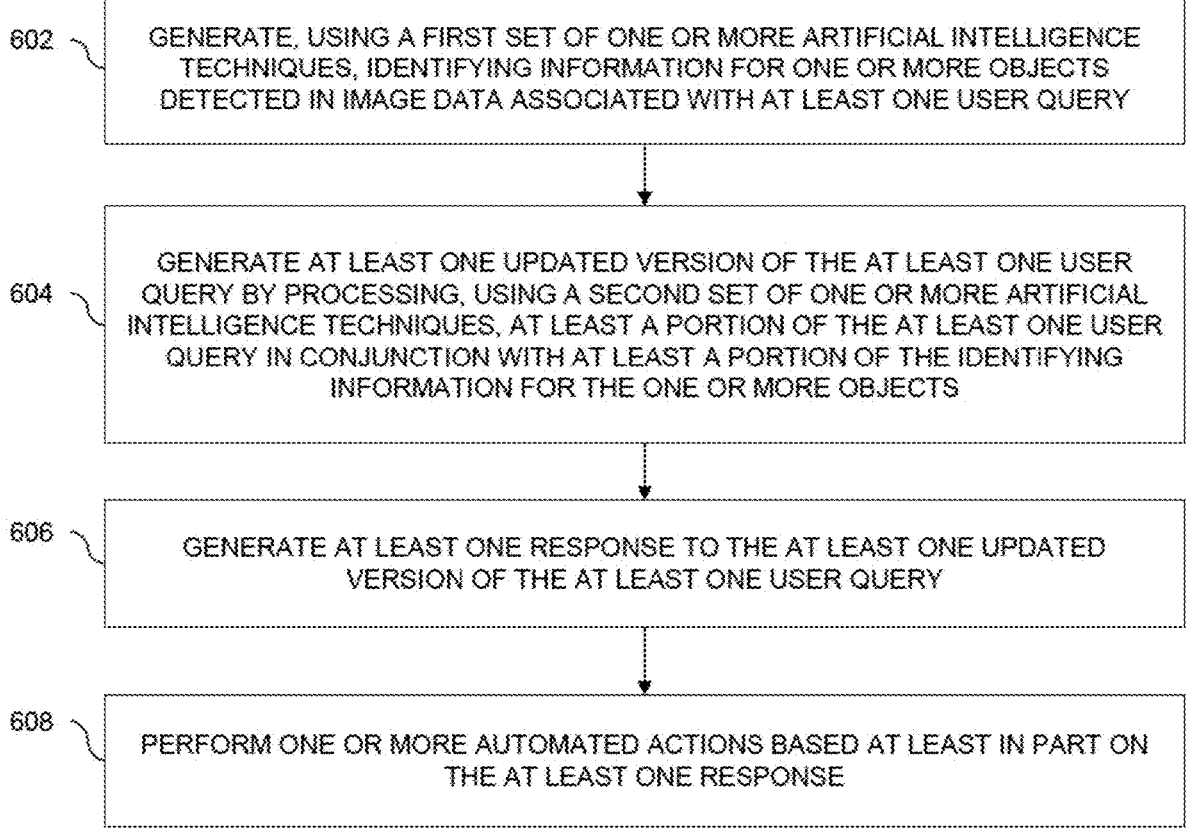

602 — GENERATE, USING A FIRST SET OF ONE OR MORE ARTIFICIAL INTELLIGENCE TECHNIQUES, IDENTIFYING INFORMATION FOR ONE OR MORE OBJECTS DETECTED IN IMAGE DATA ASSOCIATED WITH AT LEAST ONE USER QUERY

604 — GENERATE AT LEAST ONE UPDATED VERSION OF THE AT LEAST ONE USER QUERY BY PROCESSING, USING A SECOND SET OF ONE OR MORE ARTIFICIAL INTELLIGENCE TECHNIQUES, AT LEAST A PORTION OF THE AT LEAST ONE USER QUERY IN CONJUNCTION WITH AT LEAST A PORTION OF THE IDENTIFYING INFORMATION FOR THE ONE OR MORE OBJECTS

606 — GENERATE AT LEAST ONE RESPONSE TO THE AT LEAST ONE UPDATED VERSION OF THE AT LEAST ONE USER QUERY

608 — PERFORM ONE OR MORE AUTOMATED ACTIONS BASED AT LEAST IN PART ON THE AT LEAST ONE RESPONSE

*FIG. 6*

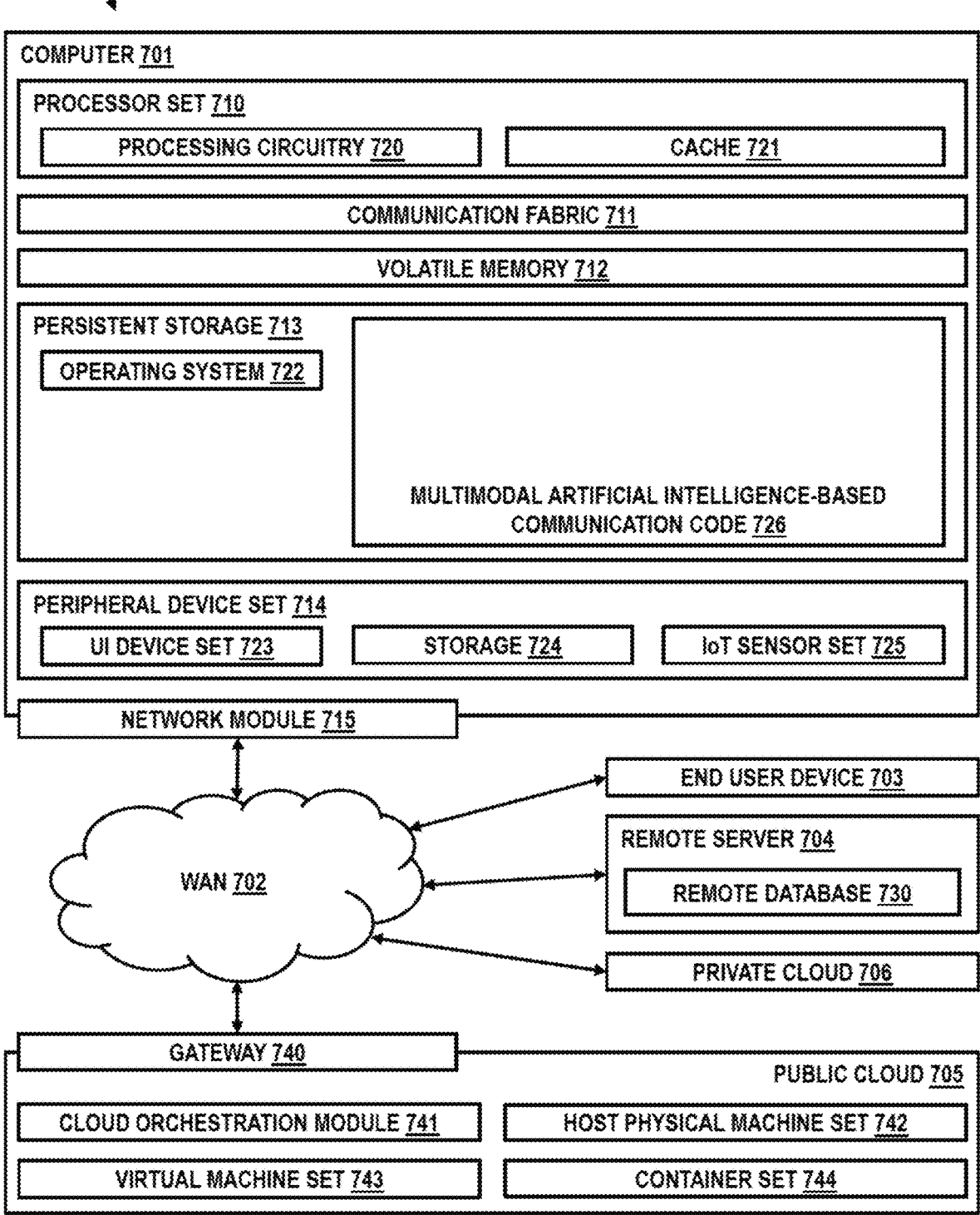

700

COMPUTER 701

PROCESSOR SET 710

PROCESSING CIRCUITRY 720  CACHE 721

COMMUNICATION FABRIC 711

VOLATILE MEMORY 712

PERSISTENT STORAGE 713

OPERATING SYSTEM 722

MULTIMODAL ARTIFICIAL INTELLIGENCE-BASED COMMUNICATION CODE 726

PERIPHERAL DEVICE SET 714

UI DEVICE SET 723  STORAGE 724  IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741  HOST PHYSICAL MACHINE SET 742

VIRTUAL MACHINE SET 743  CONTAINER SET 744

FIG. 7

MULTIMODAL ARTIFICIAL INTELLIGENCE-BASED COMMUNICATION SYSTEMS

BACKGROUND

The present application generally relates to information technology and, more particularly, to language processing techniques. More specifically, artificial intelligence techniques are commonly implemented to respond to user queries. However, conventional approaches typically fail to leverage or incorporate contextual and/or environment-related information in generating responses to user queries, often resulting in inaccurate and/or erroneous responses.

SUMMARY

In at least one embodiment, multimodal artificial intelligence-based communication systems and uses thereof are provided.

An example computer-implemented method includes generating, using a first set of one or more artificial intelligence techniques, identifying information for one or more objects detected in image data associated with at least one user query. The method also includes generating at least one updated version of the at least one user query by processing, using a second set of one or more artificial intelligence techniques, at least a portion of the at least one user query in conjunction with at least a portion of the identifying information for the one or more objects. Further, the method additionally includes generating at least one response to the at least one updated version of the at least one user query, and performing one or more automated actions based at least in part on the at least one response.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 6 is a flow diagram illustrating techniques according to an example embodiment of the invention; and FIG. 7 is a diagram illustrating a computing environment in which at least one embodiment of the invention can be implemented.

DETAILED DESCRIPTION

Figure 1:
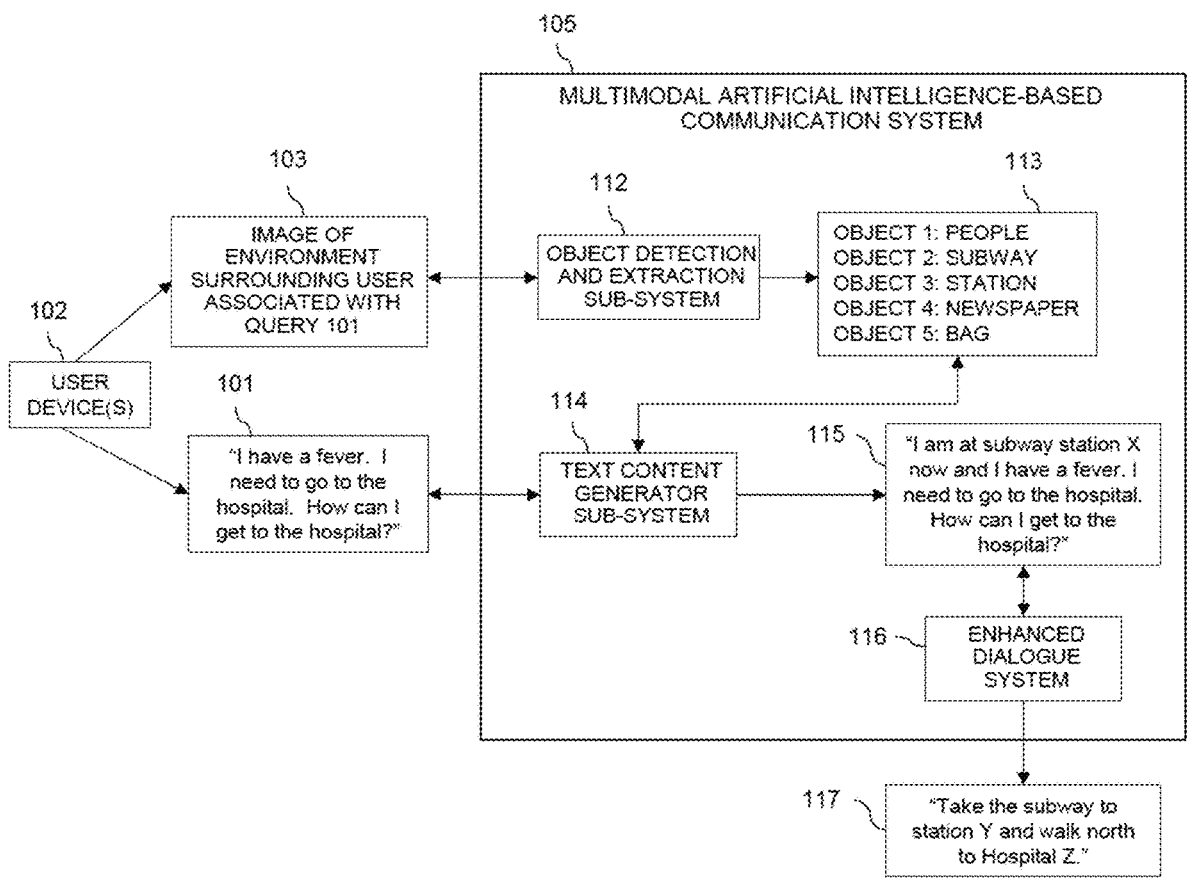
FIG. 1 is a diagram illustrating an example architecture of a multimodal artificial intelligence-based communication system, according to an example embodiment of the invention.

As described herein, at least one embodiment includes generating and/or implementing multimodal artificial intelligence-based communication systems using environmental information. Such an embodiment includes performing object detection by processing, using one or more artificial intelligence techniques, data pertaining to one or more images of an environment relative to at least one particular user (e.g., a user associated with a given query being processed in connection with the object detection). Additionally, in one or more embodiments, the one or more images can be captured, for example, by one or more devices (e.g., augmented reality (AR) glasses, one or more smartphones, one or more tablets, etc.) proximate to and/or utilized by the at least one particular user. At least one embodiment also includes extracting at least a portion of one or more objects detected in the one or more environment images. In such an embodiment, extracting at least a portion of one or more objects detected in environment images can be achieved using techniques that involve image processing and computer vision methods. For example, such techniques can include bounding box annotation, semantic segmentation, instance segmentation, GrabCut, etc.

One or more embodiments additionally include generating text content based at least in part on environmental information derived from the above-noted object detection and extraction. In such an embodiment, text content is generated in connection with analyzing at least a portion of the extracted object(s) and a given query associated with the at least one particular user (e.g., a query submitted by the at least one particular user for which a related artificial intelligence system (e.g., a chatbot) will generate a response). By way merely of example, such generated text content can include a textual description of the environment of the at least one particular user (e.g., a description of one or more objects in the vicinity of the at least one particular user, a description of the ambient conditions associated with the at least one particular user, a description of one or more issues identified as being related to the at least one particular user, etc.). Further, in one or more embodiments, generating such text content can include processing data pertaining to the environmental information derived from the above-noted object detection and extraction using at least one large language model (LLM) and/or at least one topic aware sequence-to-sequence (TA-Seq2Seq) model.

In such an embodiment, a TA-Seq2Seq model is used to generate text content, based on environmental information derived from object detection and extraction, while being aware of the topic and/or context of the communication and/or conversation. With respect to training and implementation of such a TA-Seq2Seq model, a large number of open dialogue datasets can be utilized for training purposes, wherein all texts are filtered, e.g., for nouns after word separation and lexical annotation. Then, the resulting raw data can be aggregated, including the corresponding message(s) and keywords after processing.

Additionally, it is to be appreciated that a TA-Seq2Seq model is an extension of a standard sequence-to-sequence (Seq2Seq) model with topic-aware capabilities. Also, as further detailed in connection with FIG. 4 and FIG. 5, a TA-Seq2Seq model includes at least one encoder component, at least one joint attention component, and at least one decoder component. An encoder takes a user's query as input, using one or more recurrent and/or transformer layers to capture the information. For example, in at least one embodiment, a topic module can be implemented which helps the TA-Seq2Seq model capture the keywords of the environment. A topic module can be a component in the encoder and/or decoder, and the module may involve an attention mechanism and/or some form of topic modeling.

A joint attention component, in the context of natural language processing and machine learning, typically refers to a mechanism that combines two or more attention mechanisms to focus on different aspects of data simultaneously. Message attention is an attention mechanism that focuses on elements within a message and/or input text. Topic attention refers to an attention mechanism that identifies and/or assigns relevance to the related keywords of the given communication and/or conversation. In one or more embodiments, the combination of these two attention mechanisms indicates that the given TA-Seq2Seq model is designed to simultaneously focus on the content within the user's message and the topic of the conversation when generating a response. Additionally, a decoder, as noted above, generates the response text while considering both the user input and the topic information.

Further, training a TA-Seq2Seq model can include using model parameters which include embeddings, model architecture, etc. The embeddings can include pre-trained word embeddings such as, e.g., Word2Vec, global vectors for word representation (GloVe), and/or bidirectional encoder representations from transformers (BERT) embeddings, which can be used to initialize word representations. Additionally, in one or more embodiments, the model architecture of the encoder and decoder can vary, including, e.g., long short-term memory (LSTM) architectures, gated recurrent unit (GRU) architectures, or transformer-based architectures.

After the TA-Seq2Seq model is trained, it can be used for inference. During the inference, the TA-Seq2Seq model takes a user's query and related extracted environmental information as input and generates a response. Accordingly, in such an embodiment, the TA-Seq2Seq model considers both the textual information in the query, the environmental context derived from object detection and extraction, and the context and/or topic of the conversation to generate meaningful and relevant text content as output.

Additionally, at least one embodiment includes leveraging at least a portion of the generated text content to generate a response to the given query associated with the at least one particular user. By way merely of example, such an embodiment can include outputting at least a portion of the generated text content to one or more artificial intelligence-based chatbots, which will then process the provided generated text content in conjunction with the given query associated with the at least one particular user. As used herein, a chatbot refers to at least one computer program (which can include, e.g., one or more artificial intelligence techniques) which is designed and/or configured to process and simulate human conversation via the use of text-based and/or audio-based exchanges with one or more users.

At least one embodiment of the present invention may provide a beneficial effect such as, for example, automatically generating dialogue text that incorporates environmental information relevant to a given user associated with the dialogue, thereby enhancing the accuracy of the dialogue responses.

FIG. 1 is a diagram illustrating an example architecture of a multimodal artificial intelligence-based communication system, according to an example embodiment of the invention. By way of illustration, FIG. 1 depicts user device(s) 102 submitting a query 101, to multimodal artificial intelligence-based communication system 105, wherein the query states the following: "I have a fever. I need to go to the hospital. How can I get to the hospital?" By way of illustrating contrast with one or more embodiments, a conventional approach may include processing such a query with a conventional chatbot to generate a response such as "Take a taxi and go to Hospital Z."

However, in connection with one or more embodiments, query 101 is used in conjunction with image data. As depicted in the FIG. 1 example, image 103 of the environment surrounding the user associated with query 101 is captured by user device(s) 102 (e.g., a device associated with query 101 such as a mobile phone, tablet, AR glasses, etc.) and processed by object detection and extraction sub-system 112 of multimodal artificial intelligence-based communication system 105. Object detection and extraction sub-system 112 processes at least a portion of image 103 and identifies and extracts one or more objects 113, which can include, for example, one or more people, portions of a subway car, portions of a subway station, a newspaper, and at least one bag. At least a portion of these objects 113, as well as query 101, are provided to and/or processed by text content generator sub-system 114 of multimodal artificial intelligence-based communication system 105.

Such processing by text content generator sub-system 114 can result in the generation of a new and/or updated query 115, which can state, for example, the following: "I am at subway station X now and I have a fever. I need to go to the hospital. How can I get to the hospital?" Query 115 can then be provided to and/or processed by enhanced dialogue system 116 of multimodal artificial intelligence-based communication system 105, wherein enhanced dialogue system 116 processed query 115 and generates a response 117, which can include, for example, the following: "Take the subway to station Y and walk north to Hospital Z." In at least one embodiment, enhanced dialogue system 116 can include one or more chatbots (e.g., one or more chatbots operating in the background of a given system), which generate and output response 117 to the user associated with query 101.

Figure 2:
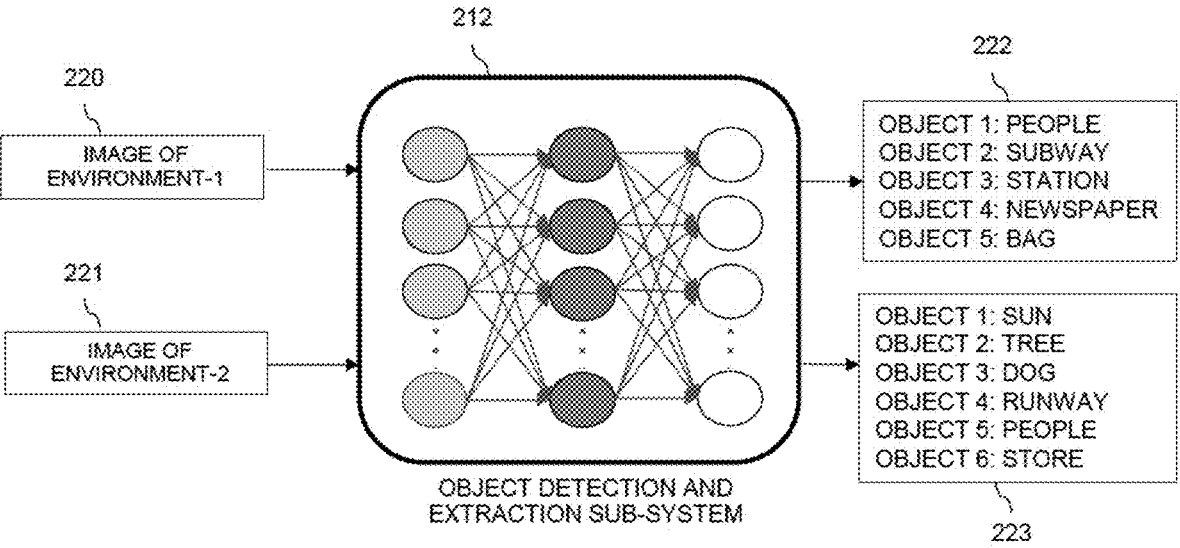
FIG. 2 is a diagram illustrating an example object detection and extraction sub-system, according to an example embodiment of the invention.

FIG. 2 is a diagram illustrating an example object detection and extraction sub-system, according to an example embodiment of the invention. By way of illustration, FIG. 2 depicts object detection and extraction sub-system 212, which can include one or more pretrained artificial intelligence models including one or more neural networks (e.g., at least one You Only Look Once (YOLO) model, at least one MobileNet model, and/or at least one fast region-based convolutional neural network (Fast R-CNN) model). In at least one embodiment, such a pretrained model (e.g., pretrained using one or more open source datasets) are directly used to extract objects from image data. Additionally or alternatively, such a pretrained model can be fine-tuned with one or more self-organized datasets to render the model more suitable for one or more particular contexts and/or users.

Accordingly, in one or more embodiments, the pretrained model of object detection and extraction sub-system 212 is used to process image data such as, image 220 of a first environment and image 221 of a second environment, wherein such processing results in the identification and extraction of various objects 222 and 223, respectively. As further detailed herein, at least a portion of such objects 222 and/or 223 can be used to derive environmental information which can be used to assist in enhancing one or more user queries for processing by at least in enhanced dialogue system.

Figure 3:
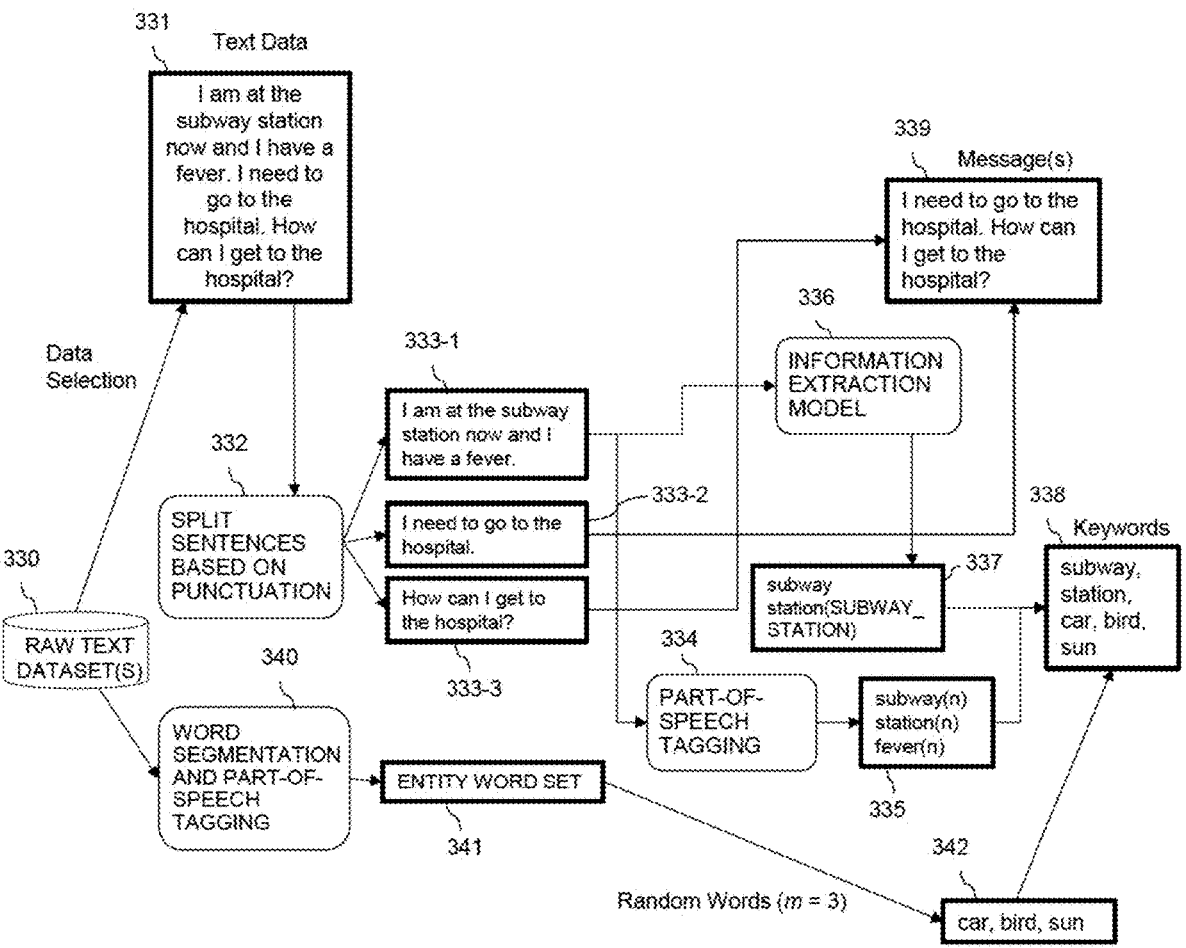
FIG. 3 is a diagram illustrating text data processing, according to an example embodiment of the invention.

FIG. 3 is a diagram illustrating text data processing, according to an example embodiment of the invention. By way of illustration, FIG. 3 depicts text data 331 selected from raw text dataset(s) 330, where such a selection can be based, for example, on passages with at least two punctuation marks. At step 332, text data 331 can then be divided into P sentences (e.g., sentences 333-1, 333-2, and 333-3) based at least in part on the punctuation present, including, for example, identification of a question (e.g., sentence 333-3) based on the presence of a question mark. Then, in one or more embodiments, Q sentences (wherein Q is a random variable wherein $0 \leq Q < P$) are randomly selected from the P sentences and kept as one or more messages 339. In the example FIG. 3 embodiment, sentences 333-2 and 333-3 are selected and kept as message(s) 339.

The remaining sentence(s) is/are randomly selected using at least one pretrained information extraction model 336 (e.g., a unifying information extraction (UIE) model) to extract $n_1$ entity words ($n_1$ may be 0, and the labels of message extraction and image target recognition remain consistent) and $n_2$ randomly extracted nouns based at least in part on lexicality (e.g., using part-of-speech tagging in step 334). In the example FIG. 3 embodiment, sentence 333-1 is processed using pretrained information extraction model 336 to extract entity words 337 including "subway" and "station(SUBWAY_STATION)," while sentence 333-1 is also processed using part-of-speech tagging in step 334 to extract nouns 335 including "subway," "station," and "fever." At least a portion of entity words 337 and nouns 335 are then used and/or compiled in a set of keywords 338.

Additionally, as also depicted in FIG. 3, an entity word set 341 can be derived and/or generated from raw text dataset(s) 330 using word segmentation and part-of-speech tagging in step 340. From the entity word set 341, m random entity words are added as perturbations and kept as keywords in set of keywords 338. In the example FIG. 3 embodiment, m=3, and the three random words 342 from entity word set 341 include "car," "bird," and "sun," and those words are included the set of keywords 338.

In connection with model building associated with one or more embodiments, such an embodiment can include aggregating text data 331, the corresponding message(s) 339, and the set of keywords 338 for further processing.

Figure 4:
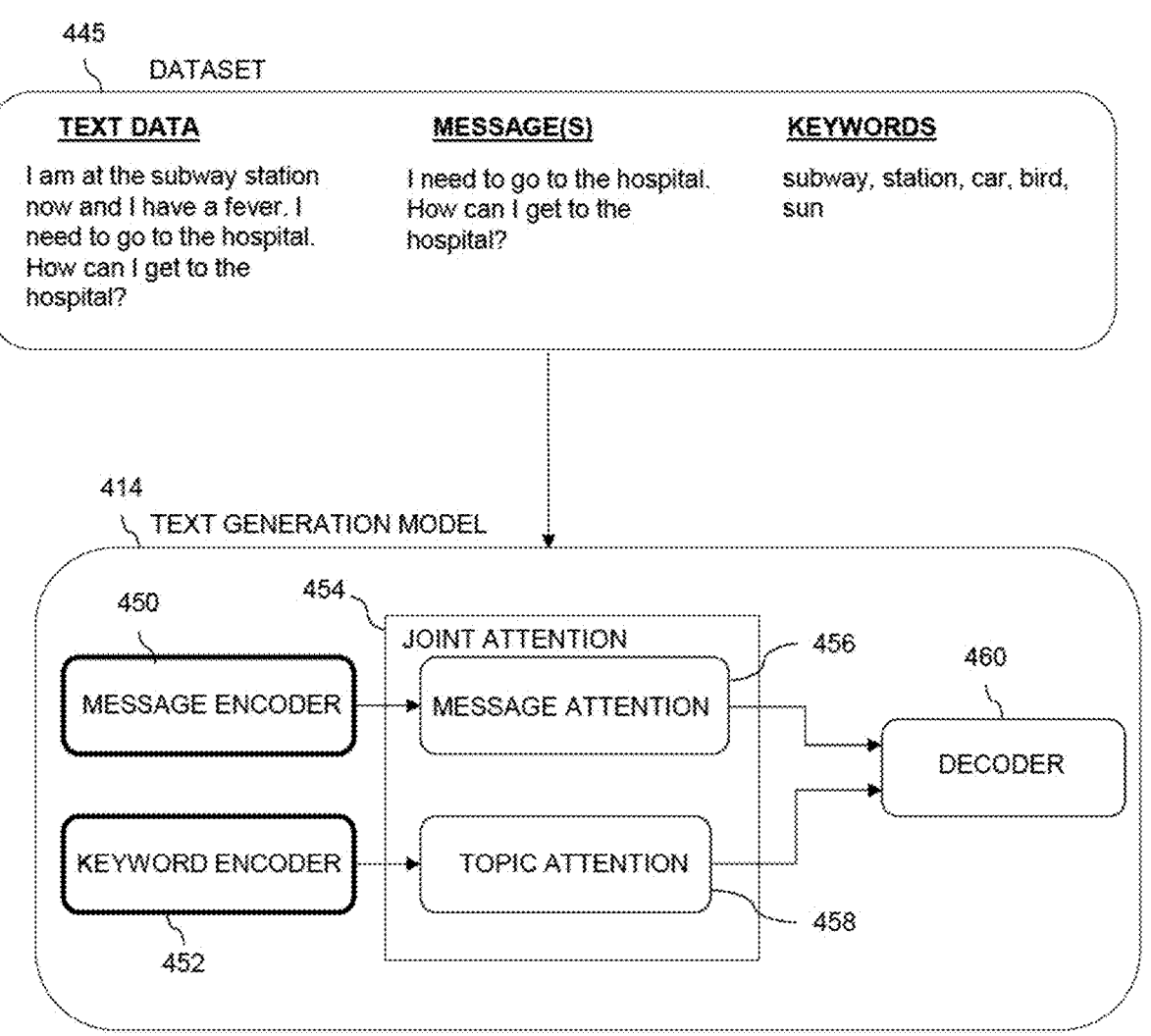
FIG. 4 is a diagram illustrating training a text generation model, according to an example embodiment of the invention.

FIG. 4 is a diagram illustrating training a text generation model, according to an example embodiment of the invention. By way of illustration, FIG. 4 depicts dataset 445, which includes an aggregation of the text data 331, the corresponding message(s) 339, and the set of keywords 338 from FIG. 3, as detailed above. As also depicted in FIG. 4, dataset 445 is then provided to and/or used to train text generation model 414, which can represent at least a portion of a text content generator sub-system such as depicted in FIG. 1 as element 114. In at least one embodiment, text generation model 414 can include a TA-Seq2Seq model.

As described above and herein, text generation model 414 can include message encoder 450, keyword encoder 452, joint attention component 454 (which includes message attention component 456 and topic attention component 458), and decoder 460. Message encoder 450 takes the user's query (e.g., corresponding message(s) 339 from FIG. 3) from dataset 445 as input, and the message encoder 450 includes one or more recurrent and/or transformer layers to capture the information. Joint attention component 454, as noted, combines message attention component 456 and topic attention component 458 to focus on different aspects of data simultaneously. The message attention component 456 is an attention mechanism that focuses on elements within the message and/or input text, whereas the topic attention component 458 refers to an attention mechanism that identifies and/or assigns relevance to related keywords of the communication and/or conversation. Additionally, decoder 460 generates the response text while considering both the user input and related topic information.

Figure 5:
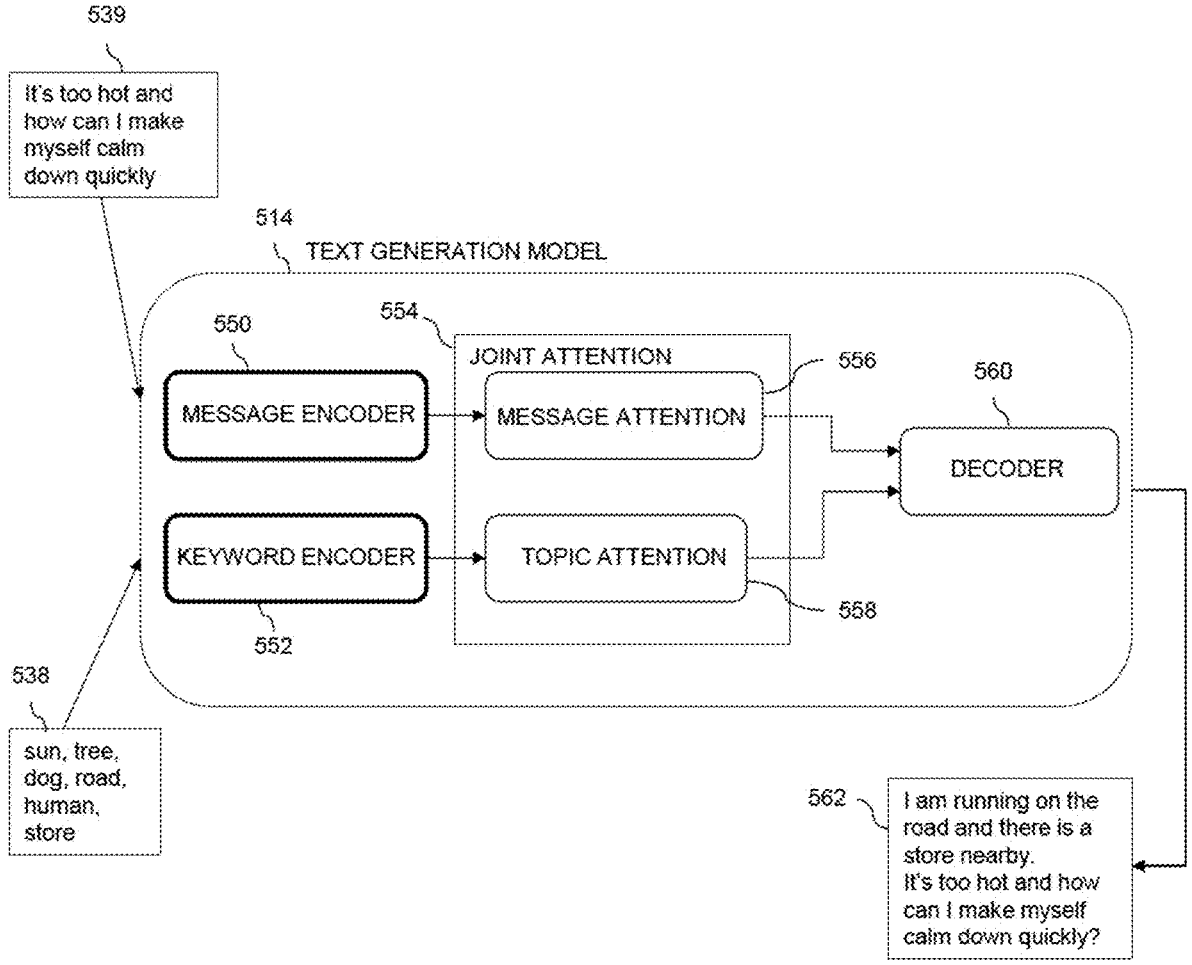
FIG. 5 is a diagram illustrating generating text using a trained text generation model, according to an example embodiment of the invention.

FIG. 5 is a diagram illustrating generating text using a trained text generation model, according to an example embodiment of the invention. By way of illustration, FIG. 5 depicts text generation model 514 prediction in the form, for example, of text generation with combined environmental information (derived from image data such as detailed herein). By way merely of example, using, as input, a user's original query and one or more object-related keywords extracted from image data related to the user's environment, new and/or updated text is generated using the trained text generation model 514 (e.g., a trained TA-Seq2Seq model) while preserving one or more portions of the user's original query semantics.

In the FIG. 5 example, a message 539 of "It's too hot and how can I make myself calm down quickly" is processed by the message encoder 550 of text generation model 514, and keywords 538 of "sun, tree, dog, road, human, and store" are processed by keyword encoder 552 of text generation model 514. Joint attention component 554 combines message attention component 556 and topic attention component 558 to simultaneously focus on the content within the user's message and the topic(s) of the conversation when generating a response. Accordingly, the original message and additional related keywords (e.g., "road" and "store") will be used for generating the output text. As such, decoder 560 of text generation model 514 ultimately generates and/or outputs updated text 562 that states the following: "I am running on the road and there is a store nearby. It's too hot and how can I make myself calm down quickly?"

As also detailed herein, one or more embodiments include implementing at least one enhanced dialogue system (such as depicted, for example, as element 116 in FIG. 1). In such an embodiment, updated text (such as depicted, for example, as element 562 in FIG. 5) based on an original user query and environmental information derived from image data related to the user's environment is generated by a trained text generation model (e.g., element 514 in FIG. 5). The updated text can then be provided to and/or processed by at least one enhanced dialogue system, which can include, for example, one or more chatbots, which generate at least one response to the updated text (e.g., an improved and/or more granular or relevant response than would have been generated using only the original user query).

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions in response to user queries based on processing of the text of the queries as well as image data related to the user queries (e.g., image data captured by and/or associated with the user in conjunction with submitting the user queries), and such recommendations and/or predictions can be used to initiate one or more automated actions (e.g., automatically outputting the recommendations and/or predictions to at least one user device in the form of query responses, automatically training one or more artificial intelligence techniques associated with the generation of the recommendations and/or predictions, etc.).

FIG. 6 is a flow diagram illustrating techniques according to an embodiment of the present invention. Step 602 includes generating, using a first set of one or more artificial intelligence techniques, identifying information for one or more objects detected in image data associated with at least one user query. In at least one embodiment, generating identifying information for one or more objects includes processing at least a portion of the image data associated with the at least one user query using one or more neural networks. In such an embodiment, processing at least a portion of the image data associated with at least one user query using one or more neural networks can include processing the at least a portion of the image data associated with the at least one user query using one or more of at least one Fast R-CNN model and at least one YOLO model. Additionally or alternatively, processing at least a portion of the image data associated with at least one user query using one or more neural networks can include using at least one pretrained neural network which has been additionally fine-tuned using one or more datasets relevant to one or more contexts related to the at least one user query.

Step 604 includes generating at least one updated version of the at least one user query by processing, using a second set of one or more artificial intelligence techniques, at least a portion of the at least one user query in conjunction with at least a portion of the identifying information for the one or more objects. In one or more embodiments, generating at least one updated version of the at least one user query includes processing, using at least one TA-Seq2Seq model, the at least a portion of the at least one user query in conjunction with the at least a portion of the identifying information for the one or more objects. Additionally or alternatively, generating at least one updated version of the at least one user query can include supplementing at least a portion of the at least one user query with at least one description of environmental information, derived from the at least a portion of the identifying information for the one or more objects, relevant to the at least one user query.

Step 606 includes generating at least one response to the at least one updated version of the at least one user query. In at least one embodiment, generating the at least one response includes processing the at least one updated version of the at least one user query using one or more artificial intelligence-based chatbots. Also, in such an embodiment, the at least one response can be generated in one of multiple formats (e.g., a text form, an audio format, etc.).

Step 608 includes performing one or more automated actions based at least in part on the at least one response. In one or more embodiments, performing the one or more automated actions includes automatically outputting the at least one response to at least one user device associated with the at least one response. Additionally or alternatively, performing the one or more automated actions can include automatically training, using feedback related to the at least one response, one or more of at least a portion of the first set of one or more artificial intelligence techniques and at least a portion of the second set of one or more artificial intelligence techniques.

Further, in at least one embodiment, software implementing the techniques depicted in FIG. 6 can be provided as a service in a cloud environment.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as multimodal artificial intelligence-based communication code 726. In addition to code 726, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and code 726, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Computer 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

Processor set 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in code 726 in persistent storage 713.

Communication fabric 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 712 is any type of volatile memory now known or to be developed in the future. Examples include dynamic type RAM or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

Persistent storage 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a ROM, but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in code 726 typically includes at least some of the computer code involved in performing the inventive methods.

Peripheral device set 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

Network module 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

Remote server 704 is any computer system that serves at least some data and/or functionality to computer 701.

Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

Public cloud 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

In computing environment 700, computer 701 is shown as being connected to the internet (see WAN 702). However, in many embodiments of the present invention computer 701 will be isolated from communicating over communications network and not connected to the internet, running as a standalone computer. In these embodiments, network module 715 of computer 701 may not be necessary or even desirable in order to ensure isolation and to prevent external communications coming into computer 701. The standalone computer embodiments are potentially advantageous, at least in some applications of the present invention, because they are typically more secure. In other embodiments, computer 701 is connected to a secure WAN or a secure LAN instead of WAN 702 and/or the internet. In these network connected (that is, not standalone) embodiments, the system designer may want to take appropriate security measures, now known or developed in the future, to reduce the risk that incoming network communications do not cause a security breach.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a memory configured to store program instructions; and
    a processor operatively coupled to the memory to execute the program instructions to:
        generate, using a first set of one or more artificial intelligence techniques, identifying information for one or more objects detected in image data associated with at least one user query;
        generate at least one updated version of the at least one user query by processing, using a second set of one or more artificial intelligence techniques, at least a portion of the at least one user query in conjunction with at least a portion of the identifying information for the one or more objects, wherein generating the at least one updated version of the at least one user query comprises processing, using at least one topic aware sequence-to-sequence (TA-Seq2Seg) model, the at least a portion of the at least one user query in conjunction with the at least a portion of the identifying information for the one or more objects;
        generate at least one response to the at least one updated version of the at least one user query; and

perform one or more automated actions based at least in part on the at least one response.

2. The system of claim 1, wherein generating identifying information for one or more objects comprises processing at least a portion of the image data associated with the at least one user query using one or more neural networks.

3. The system of claim 2, wherein processing at least a portion of the image data associated with at least one user query using one or more neural networks comprises processing the at least a portion of the image data associated with the at least one user query using at least one fast region-based convolutional neural network (Fast R-CNN) model.

4. The system of claim 2, wherein processing at least a portion of the image data associated with at least one user query using one or more neural networks comprises processing the at least a portion of the image data associated with the at least one user query using at least one You Only Look Once (YOLO) model.

5. The system of claim 2, wherein processing at least a portion of the image data associated with at least one user query using one or more neural networks comprises using at least one pretrained neural network which has been additionally fine-tuned using one or more datasets relevant to one or more contexts related to the at least one user query.

6. The system of claim 1, wherein generating at least one updated version of the at least one user query comprises supplementing at least a portion of the at least one user query with at least one description of environmental information, derived from the at least a portion of the identifying information for the one or more objects, relevant to the at least one user query.

7. The system of claim 1, wherein performing the one or more automated actions comprises automatically outputting the at least one response to at least one user device associated with the at least one response.

8. The system of claim 1, wherein performing the one or more automated actions comprises automatically training, using feedback related to the at least one response, one or more of at least a portion of the first set of one or more artificial intelligence techniques and at least a portion of the second set of one or more artificial intelligence techniques.

9. The system of claim 1, wherein generating the at least one response comprises processing the at least one updated version of the at least one user query using one or more artificial intelligence-based chatbots.

10. A computer program product comprising a computer readable storage medium having program instructions embodied therewith, the program instructions executable by a computing device to cause the computing device to:
        generate, using a first set of one or more artificial intelligence techniques, identifying information for one or more objects detected in image data associated with at least one user query;
        generate at least one updated version of the at least one user query by processing, using a second set of one or more artificial intelligence techniques, at least a portion of the at least one user query in conjunction with at least a portion of the identifying information for the one or more objects, wherein generating the at least one updated version of the at least one user query comprises processing, using at least one topic aware sequence-to-sequence (TA-Seq2Seq) model, the at least a portion of the at least one user query in conjunction with the at least a portion of the identifying information for the one or more objects;

generate at least one response to the at least one updated version of the at least one user query; and perform one or more automated actions based at least in part on the at least one response.

11. The computer program product of claim 10, wherein generating identifying information for one or more objects comprises processing at least a portion of the image data associated with the at least one user query using one or more neural networks.

12. The computer program product of claim 10, wherein generating at least one updated version of the at least one user query comprises supplementing at least a portion of the at least one user query with at least one description of environmental information, derived from the at least a portion of the identifying information for the one or more objects, relevant to the at least one user query.

13. The computer program product of claim 10, wherein performing the one or more automated actions comprises automatically outputting the at least one response to at least one user device associated with the at least one response.

14. A computer-implemented method comprising:

generating, using a first set of one or more artificial intelligence techniques, identifying information for one or more objects detected in image data associated with at least one user query;

generating at least one updated version of the at least one user query by processing, using a second set of one or more artificial intelligence techniques, at least a portion of the at least one user query in conjunction with at least a portion of the identifying information for the one or more objects, wherein generating the at least one updated version of the at least one user query comprises processing, using at least one topic aware sequence-to-sequence (TA-Seq2Seq) model, the at least a portion of the at least one user query in conjunction with the at least a portion of the identifying information for the one or more objects;

generating at least one response to the at least one updated version of the at least one user query; and performing one or more automated actions based at least in part on the at least one response;

wherein the method is carried out by at least one computing device.

15. The computer-implemented method of claim 14, wherein generating identifying information for one or more objects comprises processing at least a portion of the image data associated with the at least one user query using one or more neural networks.

16. The computer-implemented method of claim 14, wherein generating at least one updated version of the at least one user query comprises supplementing at least a portion of the at least one user query with at least one description of environmental information, derived from the at least a portion of the identifying information for the one or more objects, relevant to the at least one user query.

17. The computer-implemented method of claim 14, wherein software implementing the method is provided as a service in a cloud environment.

18. The computer-implemented method of claim 14, wherein performing the one or more automated actions comprises automatically outputting the at least one response to at least one user device associated with the at least one response.

19. The computer-implemented method of claim 14, wherein performing the one or more automated actions comprises automatically training, using feedback related to the at least one response, one or more of at least a portion of the first set of one or more artificial intelligence techniques and at least a portion of the second set of one or more artificial intelligence techniques.

20. The computer-implemented method of claim 14, wherein generating the at least one response comprises processing the at least one updated version of the at least one user query using one or more artificial intelligence-based chatbots.

* * * * *